Figure 3:
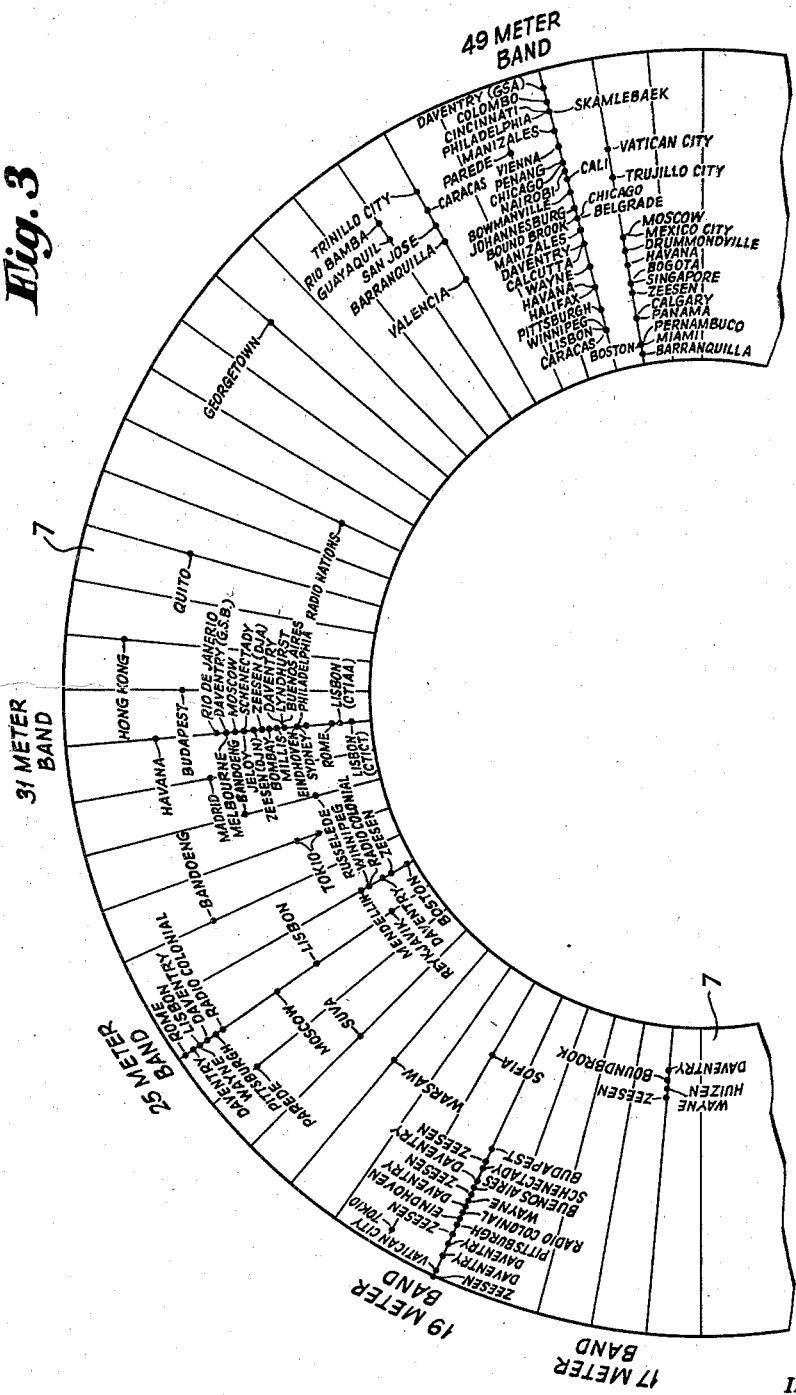

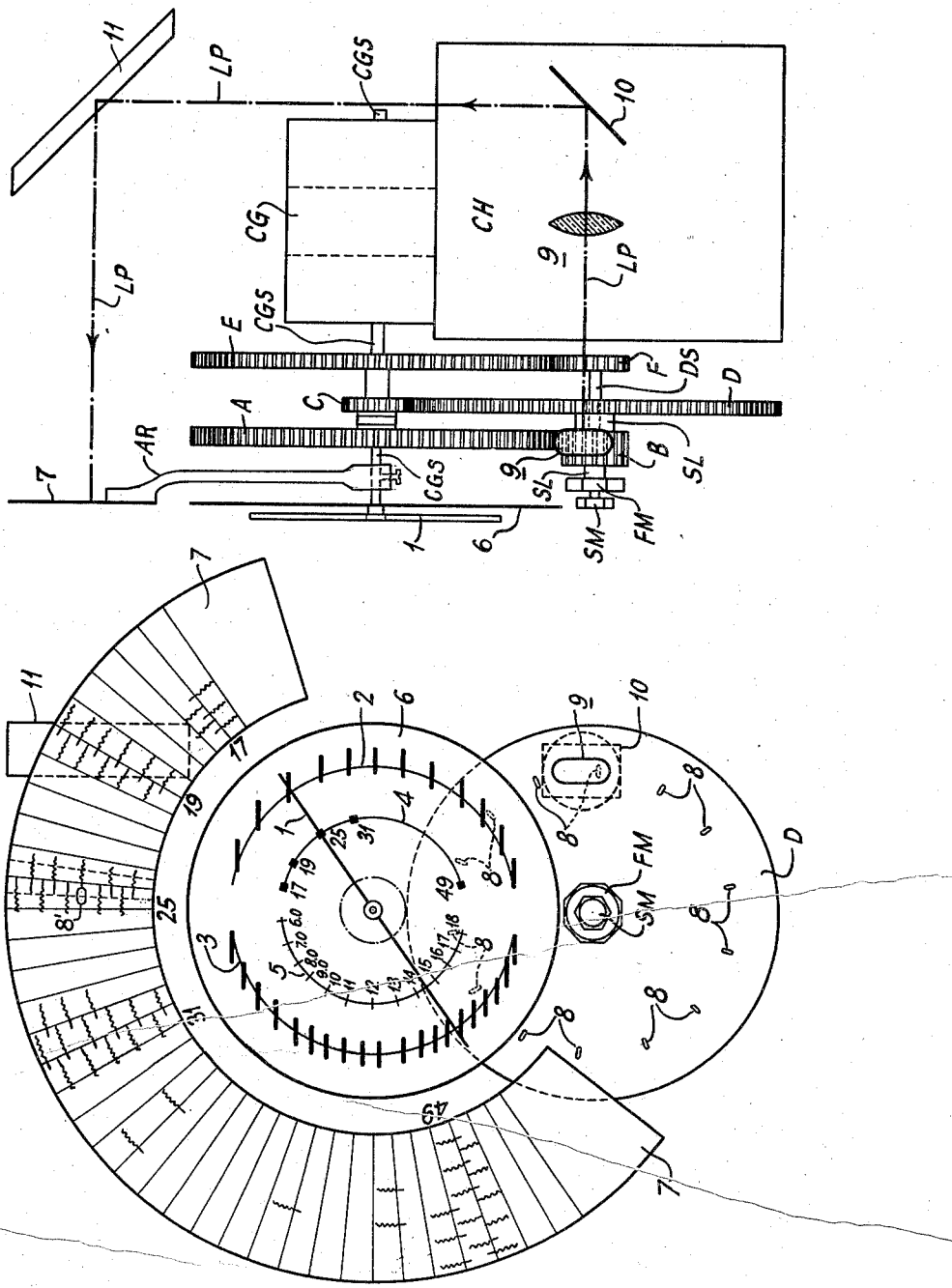

July 11, 1939.  N. M. RUST ET AL  2,165,816

TUNING INDICATOR AND SCALE

Filed Dec. 11, 1937  2 Sheets-Sheet 2

INVENTORS
NOEL MEYER RUST
AND NYMAN LEVIN
BY
ATTORNEY.

Patented July 11, 1939

2,165,816

UNITED STATES PATENT OFFICE 2,165,816

TUNING INDICATOR AND SCALE

Noël Meyer Rust, Chelmsford, and Nyman Levin, Finchley, London, England, assignors to Radio Corporation of America, a corporation of Delaware Application December 11, 1937, Serial No. 179,290
In Great Britain December 11, 1936

7 Claims. (Cl. 116—124.1)

This invention relates to tuning and other indicator and scale arrangements suitable for use in radio receivers, wave meters and the like, and, though not limited to its application thereto, is particularly advantageous for use in radio receivers capable of receiving over the normal short wave broadcast bands—at present, the 17 metre, 19 metre, 25 metre, 31.5 metre and 49 metre bands.

As is well known, owing to the fact that a very small movement of the tuning device of a short wave receiver is sufficient to produce a change of tuning over a range in which there may be several short wave transmitter stations, it is very difficult to produce an indicator and scale arrangement covering all the present short wave broadcast bands and which shall be such as to give sufficient room on the scale for the various short wave stations to be marked by name. In many present day short wave receivers a plurality of scales are used for the short wave bands, necessitating the provision of means for changing over the indicator from one scale to another, and even then the stations are often so crowded together on the individual scales that it is impracticable or inconvenient to mark them by name so that unless the operator is very familiar with the stations available, it is very easy to operate the tuning control to pass right through a station without noticing that it is there. An important object of the invention is to avoid these defects.

According to this invention an indicator and scale arrangement suitable for use in a radio receiver, wave meter, or the like, comprises a scale device and indicator means, both of which are moved with the tuning or other adjustment device whose positions are to be indicated, said scale device and indicator means being moved in coordinate directions in such a manner and at such speeds that the locus of the indications on the scale consists of a plurality of lines spaced apart along the scale and each extending across the scale, i. e. in a direction making an angle with the direction of scale movement. Preferably the arrangement is such that the lines are substantially straight lines. Preferably also indications are given by a light slot or other optical indicator.

A preferred embodiment wherein the invention is applied to a so-called "all wave" receiver, will now be described with reference to the accompanying drawings in which Figures 1 and 2 are schematically mutually perpendicular elevations and Figure 3 shows the scale 7 in more detail.

In this receiver it is presumed that tuning is effected, as in the usual way, by a condenser gang and for the sake of convenience the shaft of the gang will hereinafter be referred to simply as the tuning shaft.

Fast on the tuning shaft is a spur wheel—preferably constituted by two similar half thickness spur wheels side by side and biased away from one another (in the rotational sense) by a spring in order to minimize backlash—and loose on the said shaft but fixed to rotate together, are a pinion and a second spur wheel. The first mentioned spur wheel, which is furtherest away from the condenser gang, is the wheel A; the pinion, which is between the two spur wheels is the pinion C; and the second spur wheel, which is nearest the gang, is the wheel E. The gang is represented at CG and its shaft (the tuning shaft) is marked CGS. CH represents the receiver chassis. A and E are of the same size and C may, in a convenient arrangement, be one-fifth of the diameter of A or E. On the free end of the tuning shaft is an ordinary diametrical pointer 1 working over a plurality of ordinary known scales 2, 3, 4, 5, suitably arranged on a fixed disc 6 as in the usual way; e. g. there may be two approximately half-circular scales on a common circle 2, 3, one (2) for the long wave range and the other (3) for the medium wave range, and, concentrically inside the circle on which these scales lie, two further approximately half circular scales 4, 5, also on a common circle, one (4) for the short wave ranges with indices in metres and the other (5) for the short wave ranges with indices in frequency. The scales and pointer arrangement 1, 2, 3, 4, 5, does not constitute an arrangement in accordance with this invention. Preferably transmitting stations are marked by name on the long and medium wave scales, but there will not be room to give station name markings on the short wave scales. The disc 6 on which these scales are marked will hereinafter be termed the fixed scale disc.

Concentric with the fixed scale disc 6 is a moving scale member 7 of approximately half an annulus in shape and extent, this member extending round the fixed scale disc 6 and being driven from the tuning shaft CGS so as to rotate at the same speed e. g. by a suitable spider support and drive shown generally at AR. The moving scale member 7, which is shown separately in Figure 3, is marked with station names and with dots for the actual station tuning positions. The positions of the various markings on the moving scale member 7, which is the short wave scale member provided in accordance with this invention, will be better understood later.

Below and parallel to the tuning shaft CGS is a second shaft DS hereinafter called the drive shaft, at the outer end of which is fixed a slow motion control knob SM. On the drive shaft DS is a pinion F of the same size as C and meshing with E. Free on the drive shaft DS is a short sleeve SL on which is fast a further pinion B and a further wheel D. D is the same size as A or E and B is of the same diameter as C or F but twice the width of C or F. The sleeve SL has a fast motion control knob FM at its outer end, this knob being of larger diameter than the slow motion knob SM. The sleeve SL with its attached control knob FM is biased in the direction of the slow motion knob SM by a spring (not shown) and the arrangement is such that when the sleeve SL is in its spring biased position B engages A and D engages C. By pressing in the fast motion knob FM against the spring, however, the sleeve SL is moved until D disengages from C, leaving the members A and B, however, still in engagement owing to the width of B. The wheel D is of solid toothed disc form and has a series of short and narrow radial slots 8 fourteen in number, equally spaced along an imaginary circle concentric with the said wheel D.

A suitable lamp and optical system indicated generally in purely diagrammatic manner at 9 is provided to project light through each of these slots in succession (as it comes before the lamp) on to a fixed mirror 10 and thence via a second fixed mirror 11 on to the back of the moving scale member. The centre line of the light path is indicated in Figure 2 by the chain line LP from which the essentials of the lamp and optical system arrangements will be obvious. The arrangement is such that, when the wheel D is engaging the member C—that is to say when the sleeve SL is in its spring biased position—an accurately focussed image 8' of that slot 8 which is, for the time being, in front of the lamp, will be projected on to the moving scale member 7, this slot image being substantially at right angles to a radius of said member. The position of the slot image in the radial direction will depend upon the angular position of the slot 8 with relation to the lamp. As the wheel D rotates first one slot image sweeps across the moving scale member 7 along a path which, owing to the combined effect of the movements of the scale member 7 and of the slot image, is substantially a part of a radius of the moving scale member and when this slot image disappears over the outer edge of the moving scale member, a second slot image (due to the next slot 8) appears over the inner edge of the moving scale member and sweeps radially outwards relatively thereto, successive radial "sweeps" being side by side on the moving scale member. The actual movement of each slot image in space is not, of course, radial, but the movement relative to the scale member 7 is substantially radially. The wave length scale on the scale member will thus commence at the inner edge of the scale member, proceed radially outwards thereon till the outer edge is reached, then continue from the said inner edge at a place further along said member, proceed radially outward from this place, and so on. There is thus plenty of room for printing station names as will appear from Figure 3.

With the above embodiment the gear reduction between the slow motion knob SM and the tuning shaft CGS is 125 to 1, but by pushing in the fast motion knob FM and rotating it, a gear reduction of 5 to 1 between the said fast motion knob FM and the tuning shaft CGS is obtained. This is enough to enable the scale to be explored rapidly without serious risk of "shooting through" stations. It will be noted that, since when the fast motion knob FM is pushed in the wheel D is moved endwise, the slots 8 are moved out of the focal position and therefore the slot image on the scale member 7 will be broadened and rather blurred as to its edges. This is in practice an advantage since it will lead an operator to effect fine tuning by the slow motion knob SM for when this knob is in use the image is sharp.

Calibration will, in practice, be found a relatively simple matter. In some cases, to facilitate calibration the scale member may be adjustably mounted in a suitable moving frame, so that when some particular station is accurately tuned in, the scale member may be moved by hand in the frame until that station is correctly indicated. In the case of a high quality receiver when this has been done, the other marked stations will as a rule be found to be correct also though this may not be the case in a mass produced broadcast receiver. Further, of course, calibration may be made in known manner by adjusting the electrical circuits; e. g. in the case of a superheterodyne receiver, by making fine adjustment of the local oscillator circuit.

The scale member may conveniently be made of any suitable known material adapted to take pencil markings and from which such markings may be easily erased.

It is desirable, from the point of view of the manufacturer of mass produced broadcast receivers in particular that the scale shall be capable of mass production without the necessity of hand calibration of individual receivers. As above stated it may be found, with such receivers, that when a mass produced scale has been set in the position which gives correct indication for some particular station then being received, other marked stations are not in their correct positions on the scale. This defect will not arise in receivers with carefully selected coils and condensers but such careful selection involves an increase in cost. In cheap receivers probably the best practice is to "line up" individual receivers for known stations on each band. It is also possible to print the scale in strip form. The strip or strips representing the station distribution for each band can then be attached, or a transfer pattern impressed, so that a reference mark representing some test frequency on the band correctly registers with the optical indicator when the appropriate frequency is supplied from a test oscillator. The registration over each band would then be correct, if necessary lining up separately for each band.

We claim:

1. The combination with an adjustable tuning element of a radio receiving system, of a rotatable scale arranged to be rotated in accordance with adjustments of said tuning element, an indicating instrumentality including a light spot for indicating on the scale the adjustment of the tuning element, said instrumentality comprising a rotatable member arranged to be rotated in accordance with adjustments of the tuning element, and means for translating the rotary movements of said member into corresponding movements of the light spot the locus of which, relative to the scale, comprises a plurality of substantially evenly spaced radial lines extending across the scale.

2. An indicator and scale arrangement for signalling apparatus and the like, comprising in combination with an adjustable element of the signalling apparatus, a movable scale adapted to be moved in accordance with adjustments made on said adjustable element, a light spot cooperating with said scale to indicate thereon the adjustment of the adjustable element, means including a device movable with adjustments of the adjustable element for producing said light spot, and means for translating the movements of said device so that the locus of light spot indications on the scale consists of a plurality of lines spaced apart along the scale and each extending substantially across the scale in a direction making an angle with the direction of scale movement.

3. Means for indicating the setting of an adjustable piece of apparatus, comprising in combination a member connected to said apparatus and arranged to move through a single range of positions coincidentally with the motion of said apparatus through its full range of adjustment, image producing means connected to said apparatus and adapted to project a spot of light on said member, said light spot being controlled to move recurrently through a plurality of similar cycles of motion concurrently with the motion of said apparatus through its full range of adjustment, said member and said light spot being arranged to move substantially perpendicularly to each other at this point of coincidence whereby said light spot traces a recurrent series of lines on said member to provide a relatively long path of motion of said light spot on said member during adjustment of said apparatus through its full range of adjustment.

4. The combination with an adjustable tuning element of a radio receiving set, of a scale member movable with the tuning element, image producing means including a light source, a disk under the control of the tuning element and having uniformly spaced apertures arranged in a circle to successively appear in the path of the light source, and to project a spot of light on the scale member, the rates of movement of the scale member and of the disk being such that each disk aperture causes the light spot produced thereby to trace a path on the scale member substantially perpendicularly to the direction of movement of said scale member.

5. The combination with an adjustable tuning element of a radio receiving set, of an arcuately shaped scale member movable with the tuning element, image producing means including a light source, a disk under the control of and movable with the tuning element and having uniformly spaced apertures arranged in a circle to successively appear in the path of the light source, the rates of movement of the scale member and of the disk being different and such that each disk aperture causes the light spot produced thereby to trace a radial path equal substantially to the width of the scale member.

6. A tuning system comprising in combination a rotatable disk, image producing means whereby a spot of light is arranged to fall upon said disk, means controlled by the tuning system for moving the image producing means so as to move the light spot in a plurality of successive uni-directional motions substantially radially along said disk whereby to trace a succesion of substantially parallel paths on said disk, and a set of markings along said paths indicative of the setting of said dial corresponding to the position of said spot.

7. Means for indicating the setting of an adjustable piece of apparatus comprising in combination, a scale member connected to said apparatus and arranged to move through a single range of positions coincidentally with the motion of the apparatus through its full range of adjustment, an indicator connected to said member and including means arranged to project a spot of light on said scale member recurrently through a plurality of similar cycles of motion concurrently with the motion of the apparatus through its full range of adjustment, said scale member and said indicator being positioned relative to each other so that the spot of light moves substantially perpendicularly to the motion of the scale member at the point of coincidence whereby the spot of light traces a recurrent series of lines on said scale member to provide a relatively long path of motion of the spot of light on said scale member during adjustment of the apparatus through its full range of adjustment.

NOËL MEYER RUST.
NYMAN LEVIN.